US009845020B2

(12) United States Patent
Streett

(10) Patent No.: US 9,845,020 B2
(45) Date of Patent: *Dec. 19, 2017

(54) TRANSPORTABLE GROUND STATION FOR AN UNMANNED AERIAL VEHICLE

(71) Applicant: SWIFT ENGINEERING, INC., San Clemente, CA (US)

(72) Inventor: Andrew Streett, San Clemente, CA (US)

(73) Assignee: SWIFT ENGINEERING, INC., San Clemente, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/392,838

(22) Filed: Dec. 28, 2016

(65) Prior Publication Data

US 2017/0101017 A1 Apr. 13, 2017

Related U.S. Application Data

(63) Continuation of application No. 14/504,828, filed on Oct. 2, 2014, now Pat. No. 9,545,852.

(51) Int. Cl.
*B64C 39/02* (2006.01)
*B60L 11/18* (2006.01)
*B64F 1/22* (2006.01)
*G05D 1/00* (2006.01)
*H02J 7/35* (2006.01)

(52) U.S. Cl.
CPC .......... *B60L 11/182* (2013.01); *B64C 39/024* (2013.01); *B64F 1/222* (2013.01); *G05D 1/0011* (2013.01); *G05D 1/0088* (2013.01); *H02J 7/35* (2013.01); *B64C 2201/141* (2013.01);

(Continued)

(58) Field of Classification Search
CPC combination set(s) only.
See application file for complete search history.

(56) References Cited

U.S. PATENT DOCUMENTS 8,074,918 B1 12/2011 Monson et al.
8,511,606 B1 8/2013 Lutke
(Continued)

FOREIGN PATENT DOCUMENTS

CN 202929383 U 5/2013

OTHER PUBLICATIONS

Matternet, "Drone Startups Part 1: Matternet", https://dronologista.wordpress.com/2014/04/17/drone-startups-part-1-matternet/, Apr. 17, 2014, 2 pgs.

(Continued)

*Primary Examiner* — Adam D Tissot
*Assistant Examiner* — Edward J Pipala
(74) *Attorney, Agent, or Firm* — Perkins Coie LLP

(57) ABSTRACT

A transportable ground station for a UAV includes a container in which the UAV may be transported and housed. The container includes a wireless or contact-based recharging station that recharges the UAV's batteries or other power sources after the UAV returns from a mission. The recharging station may be directly or indirectly connected to one or more solar panels that generate energy to power the recharging station. The ground station may be deployed virtually anywhere, from any vehicle (e.g., plane, train, boat, truck, etc.), and may operate over an extended period of time without human intervention.

20 Claims, 4 Drawing Sheets

(52) U.S. Cl.
CPC .. *B64C 2201/146* (2013.01); *B64C 2201/201* (2013.01); *B64C 2201/205* (2013.01)

(56) References Cited

U.S. PATENT DOCUMENTS

| | | |
|---|---|---|
| 9,056,676 B1 | 6/2015 | Wang |
| 9,481,475 B2 * | 11/2016 | Campillo .............. B64C 39/024 |
| 2007/0025809 A1 | 2/2007 | Lee et al. |
| 2011/0068224 A1 | 3/2011 | Kang et al. |
| 2011/0144828 A1 | 6/2011 | Chengalva et al. |
| 2011/0301790 A1 | 12/2011 | Atluri et al. |
| 2012/0056600 A1 | 3/2012 | Nevin et al. |
| 2012/0068010 A1 | 3/2012 | Bossert et al. |
| 2012/0192779 A1 | 8/2012 | Teppig, Jr. et al. |
| 2012/0271491 A1 | 10/2012 | Spata et al. |
| 2013/0081245 A1 | 4/2013 | Vavrina et al. |
| 2013/0332021 A1 | 12/2013 | Goren et al. |
| 2014/0042042 A1 | 2/2014 | DeVaul et al. |
| 2014/0124621 A1 | 5/2014 | Godzdanker et al. |
| 2014/0332688 A1 | 11/2014 | Sethuvenkatraman et al. |
| 2015/0102157 A1 | 4/2015 | Godlasky et al. |
| 2015/0127209 A1 | 5/2015 | Al-Garni et al. |
| 2015/0336669 A1 * | 11/2015 | Kantor .................. G01C 21/20 701/3 |
| 2015/0370251 A1 | 12/2015 | Siegel et al. |

OTHER PUBLICATIONS

Skycatch, "Drone Startups part 3: Skycatch", https://dronologista.wordpress.com/2014/05/01/drone-startups-part-3-skycatch/, May 1, 2014, 4 pgs.

Skysense, "Drone Startups part 10: Skysense", https://dronologista.wordpress.com/2014/06/19/drone-startups-part-10-skysense/, Jun. 19, 2014, 3 pgs.

USPTO, "International Search Report and Written Opinion", for PCT/US15/51932, dated Dec. 22, 2015, 9 pgs.

* cited by examiner

TRANSPORTABLE GROUND STATION FOR AN UNMANNED AERIAL VEHICLE

CROSS REFERENCE TO RELATED APPLICATIONS

This application is a continuation of U.S. patent application Ser. No. 14/504,828, filed Oct. 2, 2014, which is incorporated herein by reference in its entirety.

BACKGROUND

Unmanned aerial systems ("UASs") or unmanned aerial vehicles ("UAVs"), such as vertical take-off and landing ("VTOL") aircraft, quadcopters and helicopters, and fixed-wing aircraft requiring runways for take-off and landing, are often deployed for military, policing, and firefighting applications, as well as for nonmilitary surveillance work. While UAVs have traditionally been effective for short-duration missions, particularly in regions where their batteries can be quickly replaced, they have not been effectively utilized for longer-duration missions, especially when deployed in regions remote from humans.

SUMMARY

A transportable ground station for a UAV includes a container in which the UAV may be transported and housed. The container includes a wireless or contact-based recharging station that recharges the UAV's batteries or other power sources after the UAV returns from a mission. The recharging station may be directly or indirectly connected to one or more solar panels that generate energy to power the recharging station. The ground station may be deployed virtually anywhere, from any vehicle (e.g., plane, train, boat, truck, etc.), and may operate over an extended period of time without human intervention. Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION OF THE DRAWINGS

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

As used herein, the terms "circuits" and "circuitry" refer to physical electronic components (i.e., hardware) and any software or firmware (i.e., "code") that may configure the hardware, be executed by the hardware, or otherwise be associated with the hardware. For example, a particular processor and memory may comprise a first "circuit" when executing a first one or more lines of code, and may comprise a second "circuit" when executing a second one or more lines of code.

As used herein, the term "mission" may refer to one or more tasks carried out by an unmanned aerial vehicle ("UAV") during a single departure from its container, or during multiple departures from its container. For example, a mission may involve a UAV being dispatched from its container to complete one or more tasks, after which it may return to the container for recharging, after which it may be re-dispatched to complete one or more additional tasks. This foregoing sequence of events may alternatively be understood to encompass multiple missions (e.g., one mission per departure).

Figure 1:
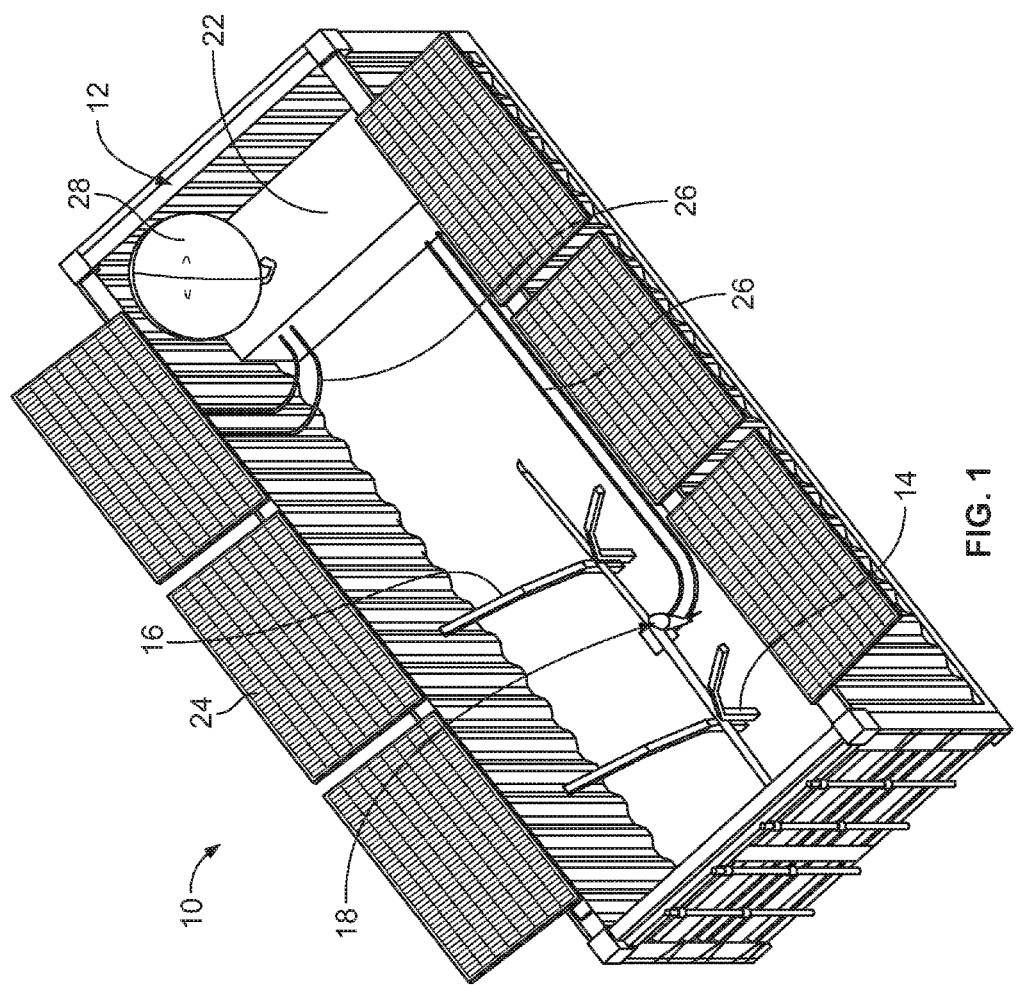
FIG. 1 is a top-perspective view of a transportable ground station for a UAV, according to one embodiment.
Figure 2:
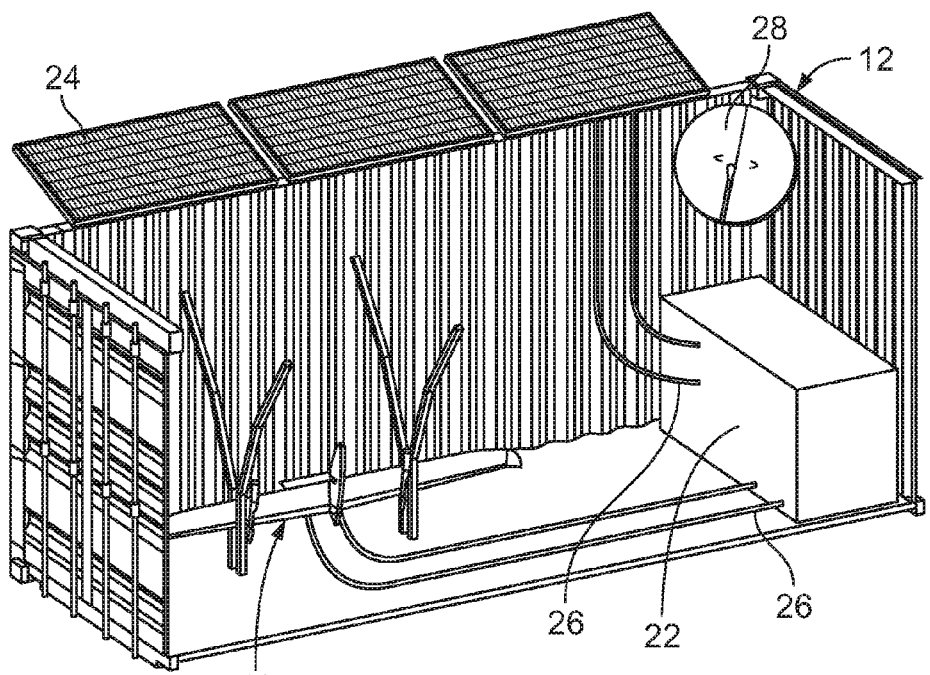
FIG. 2 is a side-perspective view of the transportable ground station shown in FIG. 1 with the sidewall omitted.
Figure 3:
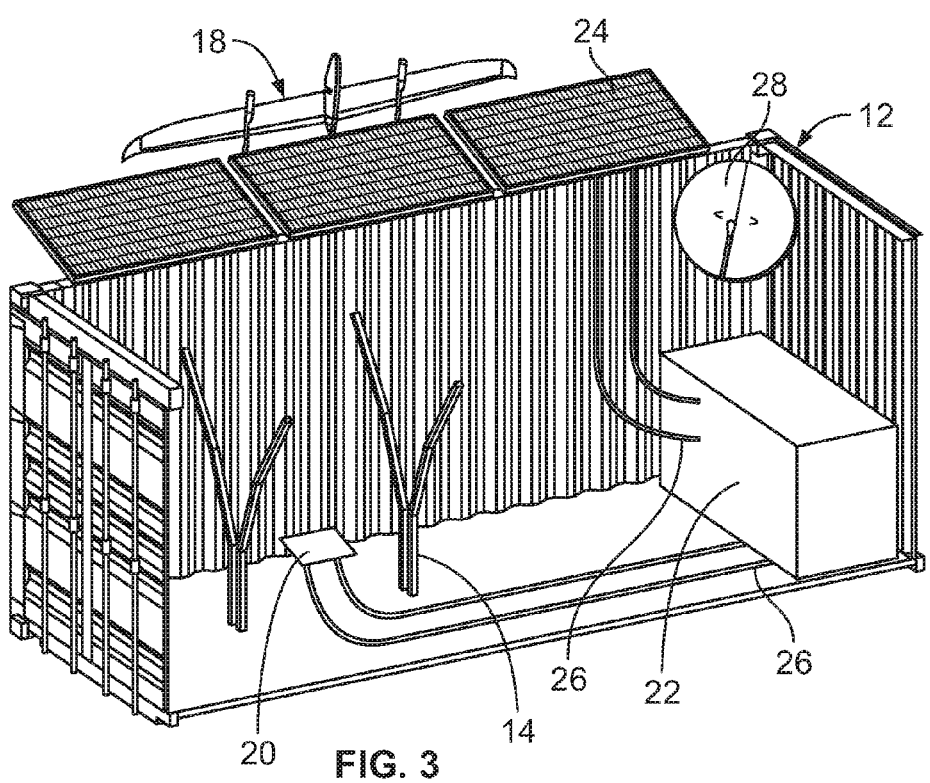
FIG. 3 is a side-perspective view of the transportable ground station shown in FIGS. 1 and 2 with the sidewall omitted and the UAV in flight.

Turning now in detail to the drawings, as shown in FIGS. 1-3, a transportable ground station 10 for a UAV 18 includes a container 12, such as a 20-foot or 40-foot standard shipping container, that houses the components of the ground station 10. The container 12 protects the components of the ground station 10 and the UAV 18 from weather, animals, unwanted human intervention, and so forth.

A UAV support structure 14 is attached to or otherwise positioned in the container 12. If the UAV 18 is a vertical take-off and landing aircraft ("VTOL"), such as one of the VTOLs described in U.S. patent application Ser. No. 14/460,013, filed Aug. 14, 2014, which is incorporated herein by reference, the support structure 14 may include generally V-shaped or Y-shaped guide arms 16 or similar features for guiding the UAV 18 into a recharging position. If the UAV is a quadcopter or helicopter, conversely, the support structure may include a landing pad or table. In these embodiments, augmented global positioning system ("GPS") signals or magnetics may be used to position the UAV within the structure. Additionally or alternatively, a funnel or similar structure may be used to direct a copter to its proper landing position.

If the UAV has a landing gear or attachment mechanism configured to engage a ground pad or other structure, such a structure may also be included. For example, if the UAV includes a robotic arm or similar mechanism, the support structure may include a ball, anchor, hook, or other feature that the robotic arm may engage.

A wireless charging pad 20, including a first induction coil or other suitable charging element, may be attached to or otherwise positioned on or near the support structure 14, or may be attached to the container 12, to form a wireless recharging station. In this embodiment, the UAV 18 includes a corresponding second induction coil or charging element associated with the UAV's one or more batteries or other power sources. The first induction coil is coupleable with the second induction coil to recharge the UAV's batteries or other power sources.

In an alternative embodiment, the recharging station may include wires or other physical connectors for recharging the UAV's batteries or other power sources. For example, a first open-contact pad may be included on the upper surface of the wing of the UAV, and a second open-contact pad may be included on the lower surface of the wing of the UAV. One of the contact pads would represent the battery's positive terminal, and the other would represent the negative terminal. The contact pads may interface with charging elements positioned on the Y-shaped guide arms 16 of the support structure 14, or they may make contact in another suitable manner.

An electronics unit or housing, such as an electronics box 22, may be attached to or otherwise positioned in or on the container 12. The electronics box 22 may include battery-recharging circuitry, a battery reservoir, UAV-health-monitoring circuitry, autonomy circuity, weather-monitoring circuitry, or any other features suitable to a UAV mission. Further, the UAV 18 may optionally provide data or other feedback via communications circuitry in the electronics box 22. In other embodiments, the UAV 18 itself may provide direct feedback via wireless or other transmission technology. In some embodiments, a weather station or other weather monitoring device may be included in the container 12. The weather station may be a standalone device or it may be integrated with the electronics box 22.

One or more solar panels 24 may be attached to or integral with the container 12. For example, solar panels 24 may be mounted or otherwise attached to the underside of one or more top panels of the container 12 such that, when the top panels are opened, the solar panels 24 face generally toward the sky for exposure to sunlight. In some embodiments, the solar panels 24 may be connected to or otherwise in communication with the electronics box 22, which in turn may be connected to or otherwise in communication with the charging pad 20 or other recharger, via power lines 26 or other elements suitable for delivering energy generated by the solar panels 24 to the charging pad 20. In other embodiments, the power lines may run directly from the solar panels 24 to the charging pad 20 or other recharger.

An antenna 28 or similar communications module or device for transmitting and receiving communication signals may be attached to or otherwise positioned in or on the container 12. In some embodiments, the antenna 28 may be mounted on the electronics box 22 and electrically connected to circuitry inside the electronics box 22. In other embodiments, the antenna may be connected to the electronic circuitry in the electronics box 22 via one or more cables, wires, or other suitable connectors. While an antenna dish is illustrated in the figures, any other suitable antenna may be used.

The ground station 10 may include a GPS or similar navigation system to aid with delivering, tracking, and retrieving the ground station 10. This system may be included in the electronics box 22 or may be positioned elsewhere in or on the container 12. Such a system is particularly useful when the ground station 10 is delivered to a location remote from humans.

Figure 4:
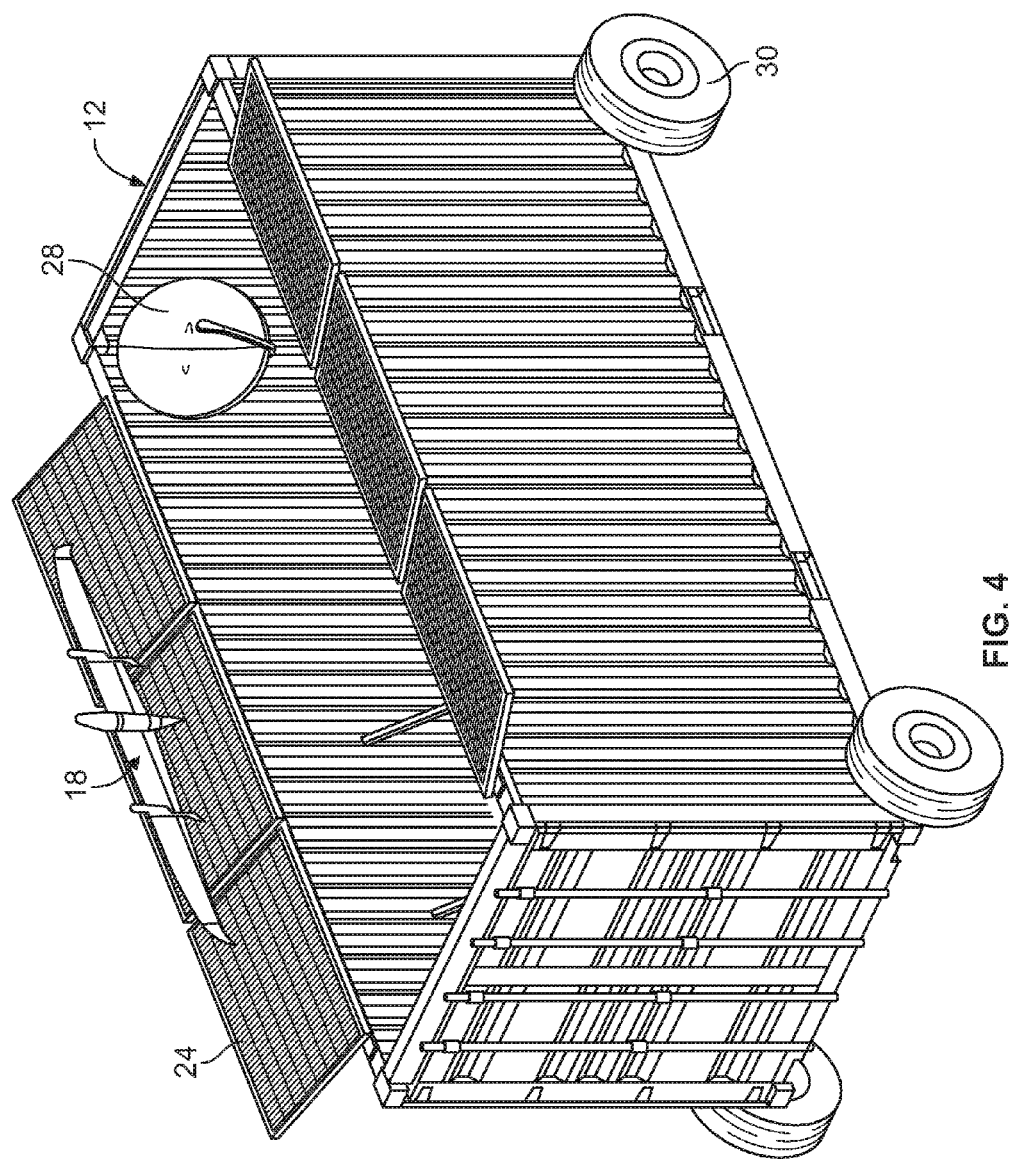
FIG. 4 is a side-perspective view of a transportable ground station including wheels, according to one embodiment.

As shown in FIG. 4, in some embodiments the container 12 may include wheels 30 or rollers to facilitate its transportation over the ground and between locations. In these embodiments, the ground station 10 may include circuitry in the electronics box 22, or in another location, that allows the ground station to be controlled remotely, or autonomously, such that the ground station 10 may be transported without the need for human intervention at the ground-station site.

Figure 5:
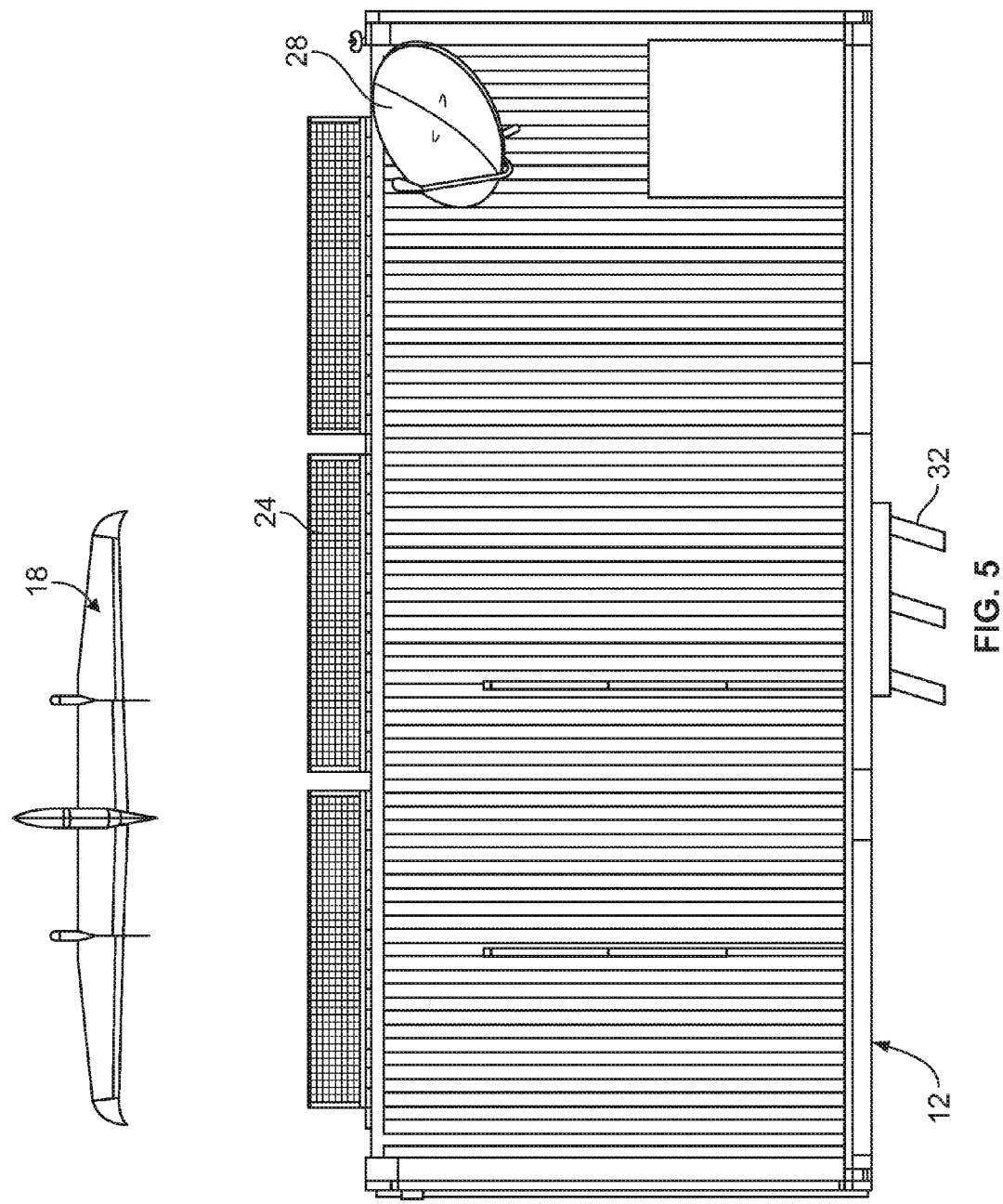
FIG. 5 is a side-perspective view of a transportable ground station including a water-propulsion system, according to one embodiment.

As shown in FIG. 5, in some embodiments the ground station 10 may include a marine propulsion system ("MPS") 32, such as a propeller, impeller, or azimuth thruster, to propel the container 12 through the water. When the ground station 10 includes wheels 30 or an MPS 32, or both, it may be guided by GPS or another navigation system to track the sun's position over land or water to maximize the energy generated by the solar panels 24.

In use, the ground station 10 may be transported to a desired location via an aircraft, automobile, boat, or other suitable vehicle. For example, the ground station 10 may be equipped with a parachute and flown on a plane (manned or unmanned), then dropped from the plane at the desired location. Or it may be transported on a boat (manned or unmanned) to a desired location in an ocean, lake, or other body of water. In this embodiment, the ground station 10 may remain on the boat's deck during the UAV's mission. In another embodiment, the ground station 10 may be transported by a truck (manned or unmanned) to a desired location, and may optionally be removed from the truck upon arrival at the desired location. In another embodiment, the ground station 10 may be transported to a dock (on its own wheels or otherwise), and may then enter the water and propel itself, using the MPS 32, to a desired location in the water.

Once the ground station 10 has been delivered to its operating location, the one or more top panels or lid may be opened to expose the inside of the container 12 to the environment, thus providing ingress and egress to the UAV 18. In some embodiments, as described above, the underside of one or more of the top panels may include one or more solar panels 24, such that, when the container 12 is opened, the solar panels 24 face generally toward the sky for exposure to sunlight. The solar panels 24 use light energy from the sun to generate electricity that may be used to power the electronics box 22 or the UAV charging pad 20.

The UAV 18 may be pre-programmed to carry out a mission, or it may be manually, remotely operated during a mission. Once the UAV 18 takes off and exits the container 12, the top panels or lid of the container 12 optionally may be automatically or manually closed to protect the interior of the container 12 from weather, animals, humans, and so forth.

Upon the UAV's return, the top panels or lid may be reopened to receive the UAV 18, which is guided onto the support structure 14. When resting on the support structure 14, the UAV's induction pad or other charging element aligns with the corresponding charging element on or near the support structure 14 so that the UAV's one or more batteries or other power sources may be wirelessly recharged (or, in other embodiments, recharged via contacts, as described above). The top panels or lid of the container 14 may optionally be automatically or manually closed during the recharging process.

The transportable ground station 10 described herein provides several advantages. For example, the ground station 10 may be dropped off at a remote location and it may carry out autonomous missions without human intervention. Further, a fully charged UAV 18 may leave the container 12 for a relatively long duration (e.g., two hours or more), and repeated missions may be carried out over several months or years without human intervention. The UAV 18 may also provide data or other feedback as required by a particular mission through a cellular network, a satellite network, or another suitable network.

Any of the above-described embodiments may be used alone or in combination with one another. Further, the transportable ground station may include additional features not described herein. While several embodiments have been shown and described, various changes and substitutions may of course be made, without departing from the spirit and scope of the invention. The invention, therefore, should not be limited, except by the following claims and their equivalents.

What is claimed is:

1. An unmanned ground station for an unmanned aerial vehicle (UAV), the ground station comprising:
   a wheeled structure, wherein the wheels facilitate movement of the ground station;
   a support structure positioned in the wheeled structure and configured to receive a UAV; and
   circuitry in or on the wheeled structure configured to facilitate remote or autonomous control of the wheels to transport the ground station.

2. The unmanned ground station of claim 1 wherein the support structure includes guide arms configured to guide the UAV into a recharging or storage position.

3. The unmanned ground station of claim 1, further comprising a recharging station in the wheeled structure configured to recharge a battery of the UAV.

4. The unmanned ground station of claim 3 wherein the recharging station is a wireless recharging station.

5. The unmanned ground station of claim 1, further comprising a solar panel attached to the wheeled structure.

6. The unmanned ground station of claim 1 wherein the wheeled structure includes an openable top panel.

7. The unmanned ground station of claim 1 wherein the wheeled structure comprises one of a 20-foot standard shipping container or a 40-foot standard shipping container.

8. The unmanned ground station of claim 1, further comprising a weather station positioned on or in the wheeled structure.

9. The unmanned ground station of claim 1, further comprising a marine propulsion system attached to the wheeled structure.

10. An unmanned ground station for an unmanned aerial vehicle (UAV), the ground station comprising:
    a housing;
    a support structure positioned in the housing and configured to receive a UAV; and
    means for facilitating transportation of the housing, wherein the housing is configured for autonomous self-transportation.

11. The unmanned ground station of claim 10, further comprising:
    a solar panel connected to the housing;
    a recharging station positioned in the housing; and
    an electronics unit positioned in the housing and connected to the solar panel, the electronics unit including recharging circuitry; wherein
    the electronics unit is connected to the recharging station and configured to provide energy generated by the solar panel to the recharging station to charge a battery in a UAV.

12. The unmanned ground station of claim 11 wherein the recharging station comprises a first induction coil configured to wirelessly couple with a second induction coil to recharge the battery of the UAV.

13. The unmanned ground station of claim 10 wherein the means for facilitating transportation of the housing comprises a plurality of wheels.

14. The unmanned ground station of claim 10 wherein the means for facilitating transportation of the housing comprises a marine propulsion system.

15. The unmanned ground station of claim 10 wherein the housing includes an openable top panel.

16. The unmanned ground station of claim 10 wherein the support structure comprises guide arms or a landing pad.

17. An unmanned ground station for an unmanned aerial vehicle (UAV), the ground station comprising:
    a housing;
    a support structure positioned in the housing and configured to receive a UAV;
    a recharging station positioned in the housing and configured to charge a battery of the UAV;
    at least one of a plurality of wheels or a marine propulsion system attached to the housing and configured to transport the ground station; and
    circuitry in or on the housing that allows movement of the ground station to be controlled remotely.

18. The unmanned ground station of claim 17 wherein the circuitry is further configured to control movement of the ground station autonomously.

19. The unmanned ground station of claim 17 wherein the housing comprises an openable top panel, the unmanned ground station further comprising a solar panel attached to the openable top panel and configured to generate energy to power the recharging station.

20. The unmanned ground station of claim 17 wherein the housing comprises a shipping container.

* * * * *